United States Patent [19]

Wade

[11] Patent Number: 5,370,082

[45] Date of Patent: Dec. 6, 1994

[54] GLOW IN THE DARK ANIMAL COLLAR

[75] Inventor: William D. Wade, Southhold, N.Y.

[73] Assignees: Charles Mockler; Terry Patterson, Sagaponack, N.Y.

[21] Appl. No.: 221,566

[22] Filed: Apr. 1, 1994

[51] Int. Cl.$^5$ .............................................. A01K 27/00
[52] U.S. Cl. ................................... 119/859; 362/108
[58] Field of Search ............... 119/859, 856, 857, 863, 119/858; 362/108; 128/859

[56] References Cited

U.S. PATENT DOCUMENTS

| | | | |
|---|---|---|---|
| 3,641,333 | 2/1972 | Gendoron | 362/108 |
| 3,944,803 | 3/1976 | Chao | 119/859 |
| 4,266,511 | 5/1981 | Muench . | |
| 4,523,258 | 6/1985 | Morse et al. | 362/108 |
| 4,875,145 | 10/1989 | Roberts | 362/108 |
| 4,895,110 | 1/1990 | LoCascio . | |
| 4,909,189 | 3/1990 | Minotti . | |
| 5,046,456 | 9/1991 | Heyman et al. | 119/863 |
| 5,070,436 | 12/1991 | Alexander et al. | 362/108 |
| 5,140,946 | 8/1992 | Pennock et al. | 119/859 |

FOREIGN PATENT DOCUMENTS

| | | | |
|---|---|---|---|
| 661173 | 2/1932 | France . | |
| 3631820 | 9/1987 | Germany . | |
| 3802861 | 8/1989 | Germany | 119/859 |
| 2166180 | 4/1980 | United Kingdom | 119/859 |

Primary Examiner—Paul J. Hirsch
Attorney, Agent, or Firm—Lilling & Lilling

[57] ABSTRACT

The illuminated animal collar includes a plurality of illuminating means along the surface of the collar. A switch is included, along with rechargeable power means. A plurality of solar cells are included to periodically recharge the rechargeable power means.

6 Claims, 4 Drawing Sheets

CIRCUIT DIAGRAM

GLOW IN THE DARK ANIMAL COLLAR

FIELD OF THE INVENTION

The invention relates to collars for animal pets, such as dogs and cats, which can glow in the dark.

BACKGROUND OF THE INVENTION

In the industry, ornamental and protective collars are known. While some of these collars are illuminated, none of the collars currently available are easy and simple to construct and use and also inexpensive.

Muench (U.S. Pat. No. 4,266,511) discloses an ornamental and protective collar for an animal, but it is not illuminated. This particular collar is designed to be highly attractive and aesthetically appealing, but is not designed to be illuminated. As a result, it fails to adequately identify an animal who may be wearing the collar at night or in other areas where there may be an absence of sufficient light to see the animals. Thus, it suffers from the disadvantage of not having illumination.

Another pet collar is disclosed by LoCascio (U.S. Pat. No. 4,895,110). While this pet collar provides for illumination, it has a complicated design and does not provide the necessary level of safety that is required. It includes a generally elongate electro-luminescent strip and a power means affixed to the collar. A disadvantage of this collar is that the electrical circuit is completed only when the collar completely encircles the neck (or other anatomical portion of the body) of the animal. If the adhesive strips or buckle or other device that is holding the collar in position becomes loose and the collar is dangling from the neck of the animal, the electrical circuit is broken and there is no illumination. This can be an especially significant problem at night when the animal is most likely to run into difficulty. If an animal becomes injured at night and the collar becomes partially dislodged, the illumination of the collar will be discontinued and the animal will lose the level of security that it requires at the time that it needs it most.

Another collar with illumination is disclosed by Minotti (U.S. Pat. No. 4,909,189). It includes light bulbs attached to the collar. A battery pack and a switch are used to activate the lights and to complete the electrical circuit. The disadvantage of this collar is that there is no means for recharging the batteries. If the batteries run down, then there will be no illumination of the collar. Thus, the animal will be rendered in the same unsafe condition as it would have been without the collar.

Therefore, there is a need in the industry for an easy and simple to use illuminated collar for an animal, which cannot become easily disconnected and in which the power supply can be continuously reenergized.

SUMMARY OF THE INVENTION

The invention may include a conventional animal collar and on which a plurality of illuminating means are disposed along its surface. Also disclosed on the surface of the collar are a plurality of solar cells. A switch and rechargeable power means are also included.

By activation of the switch, the power means is activated and the illuminated means highlight the collar and the animal during the night or at other desirable times. By means of the solar cells, the power means can be sufficiently recharged, so that there will always be sufficient power. A diode prevents the rechargeable batteries from discharging through the solar cells, and a pulse means may be employed to alternatively light the individual illuminating means. By this expedient, a simple and efficient illuminated collar is effected. As it does not rely upon the connection of the buckle or other means to attach the two ends of the collar together, it does not suffer from the disadvantage of losing illumination when the collar is partially dislodged. Further, by use of the solar cells and a rechargeable power means, the requisite level of power can always be maintained.

DETAIL DESCRIPTION OF THE INVENTION

Figure 1:
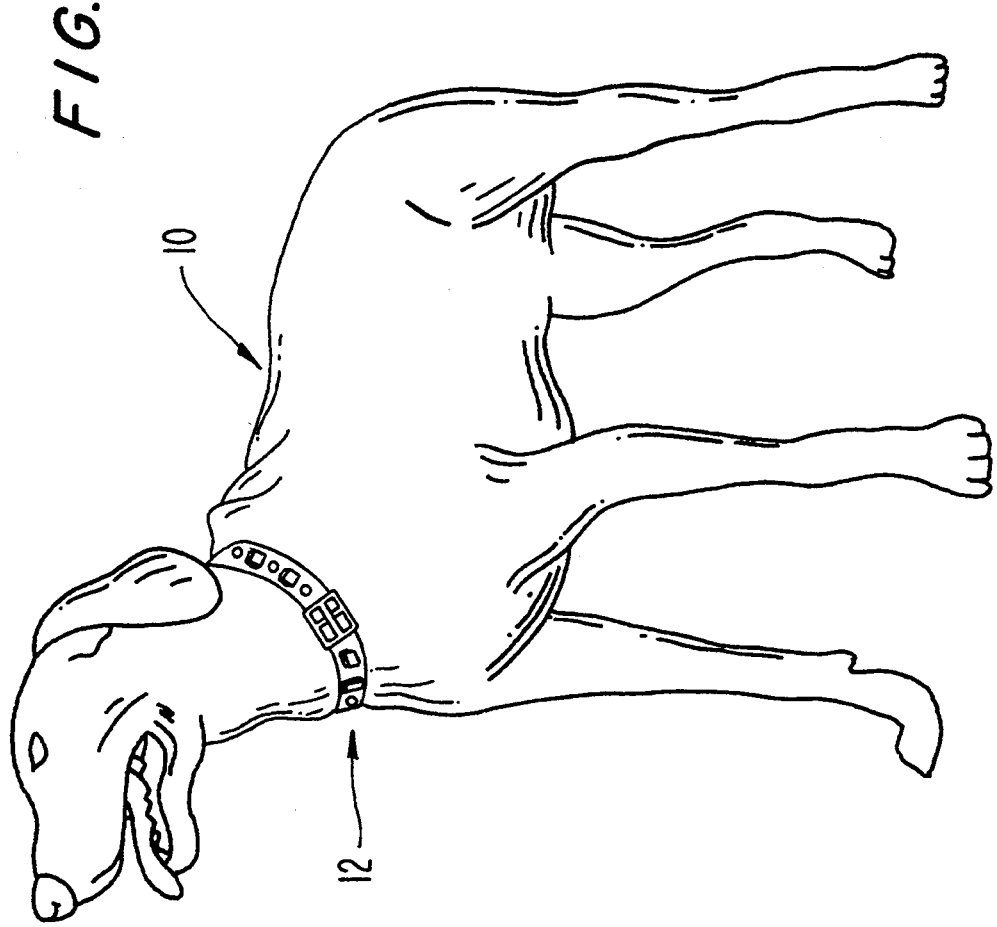
FIG. 1 is a perspective view of the illuminated animal collar of this invention as worn by an animal.
Figure 2:
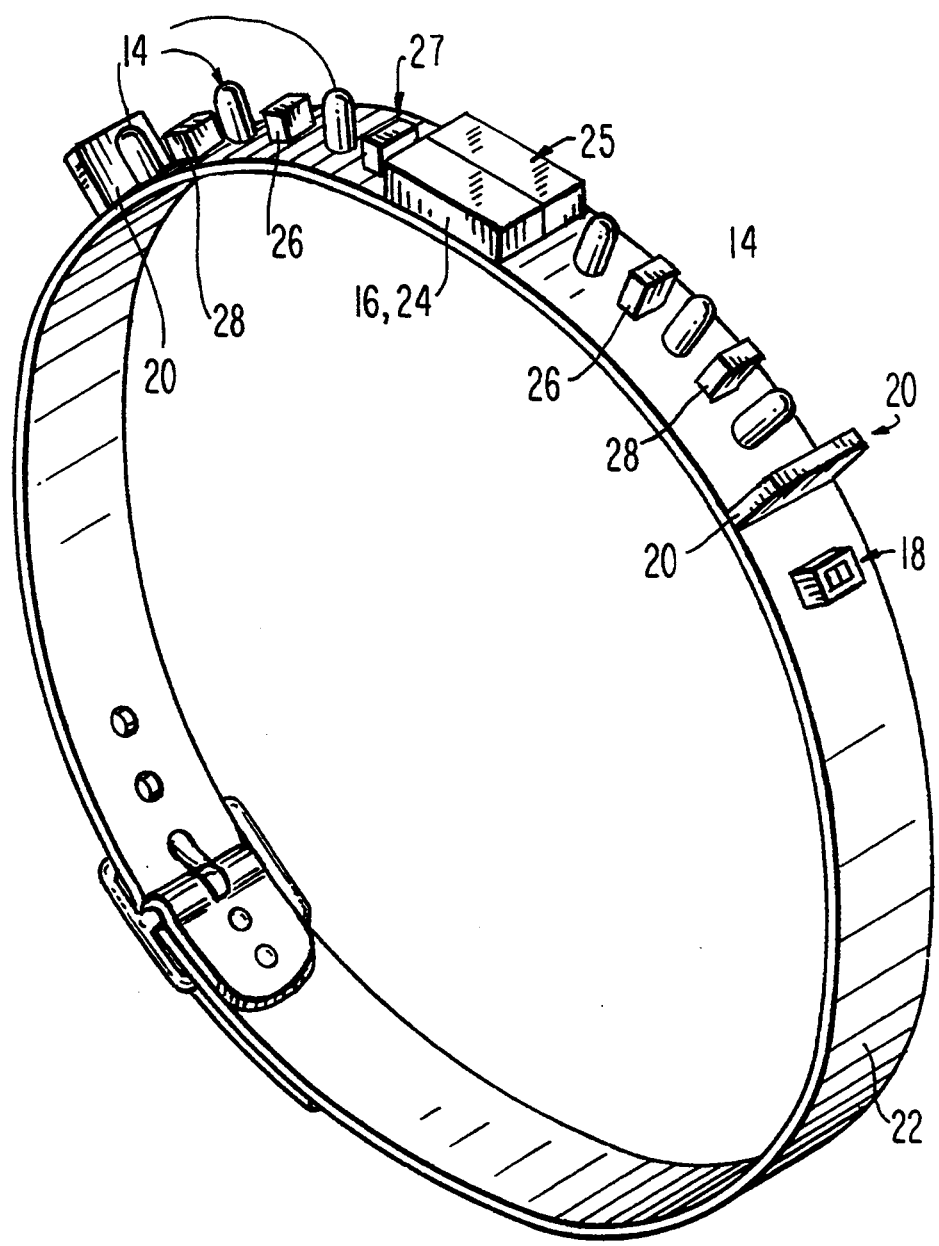
FIG. 2 is a perspective view of the illuminated animal collar of this invention.
Figure 3:
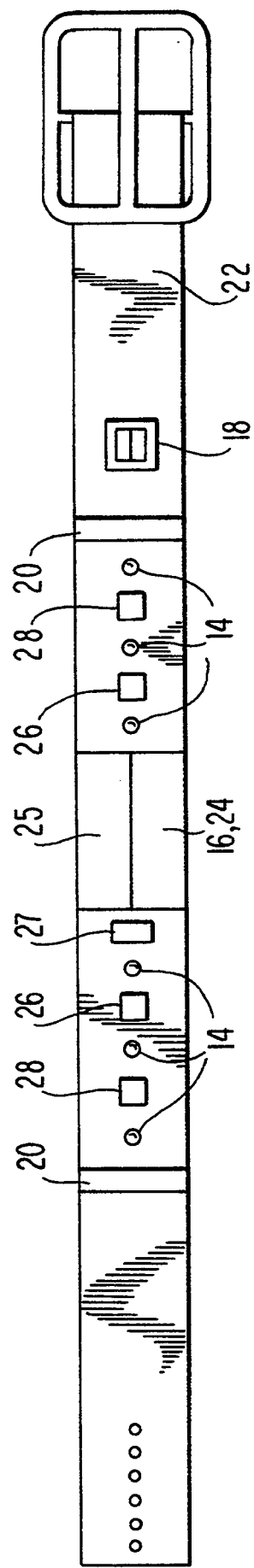
FIG. 3 is a top plan view of the illuminated animal collar of this invention, as laid flat.
Figure 4:
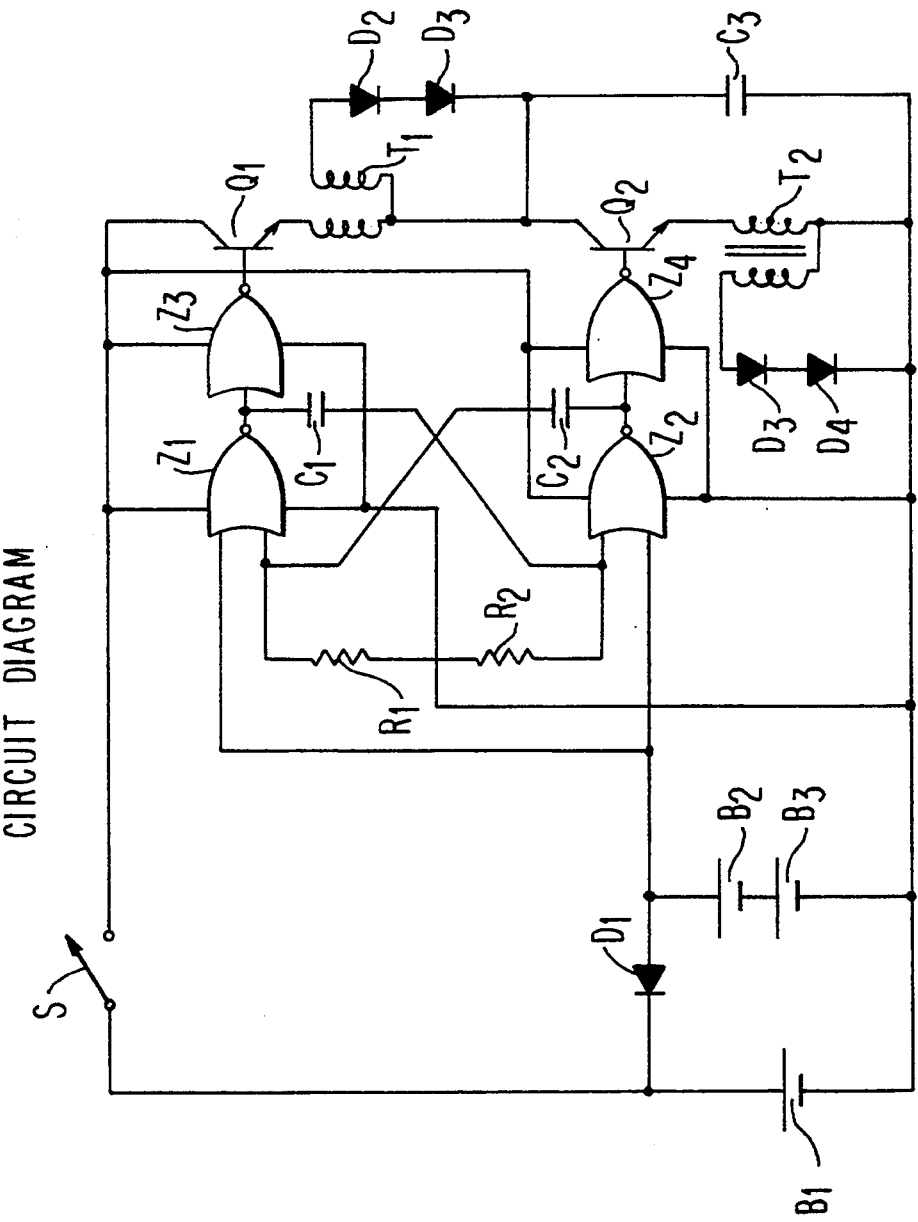
FIG. 4 is a circuit diagram of one embodiment of the invention.

The illuminated collar 12 of this invention is designed for use around the neck of an animal 10. Typically, it will be used with dogs and cats, but may be used with any other animal on which a collar may be fitted.

The invention may also be used by humans as a means of identifying joggers at night. For those persons so inclined, it may even be worn at nightclubs and discotheques in order to draw attention to oneself.

The collar 12 is made as an elongate strip of any conventional material used for animal collars, such as metal, plastic, rubber. Any conventional means may be used to affix the opposing ends of the collar around the neck of the animal, such as a buckle or adhesive strips or any other suitable means.

On the outer surface 22 of the collar 12 a plurality of illuminated means 14 are positioned. Any suitable illuminated means for outdoor use may be used. Care should be taken that the illuminated means selected can withstand water and cold and the elements in general.

In the preferred embodiment, a continuous strip of light emitting diodes may be used. Miniature lamps may also be used if desired. In some embodiments, strips of paper-thin copper backing may be used with zinc tungstate to provide a phosphorescence glow to the collar. Luminous liquid quartz strips may be used in still other embodiments. Any illuminated means which may fit on the surface of the collar may be used.

The next element of the invention is a rechargeable power means 20. This may consist of a conventional rechargeable battery of any suitable size. The size of the power means will be dependant on the number of illuminated means that are provided and the duration and frequency of their illumination.

Also along the outer surface 22 of the collar 12 are a plurality of solar cells 16. The number of solar cells will be dependant on the power requirements of the illuminating means and the length of the collar.

The solar cells are electrically connected to the power means and are used for the purpose of charging the power means during periods of high ambient light.

A power switch 18 is also included on the collar 12. Any conventional switch may be used for this purpose.

The power means 20, the illuminated means 14 and the switch 18 are connected in series. In the preferred embodiment, upon activation of the switch, the current will flow through the illuminated means and will continue to cause illumination of the collar until the switch is again activated. This construction will provide an illuminated animal collar which can-be used for many months without replacement of the power means.

In an alternate embodiment of the invention, a light sensing means 24 may also be included. It would be electrically connected to the illuminated means 14 and the rechargeable power means 20. When the level of ambient light falls below a certain level, the light sensor could then activate the rechargeable power means in order to illuminate the illuminating means 14. The solar cells 16 may also be used as part of the light sensing means 24. Since the rechargeable power means is continually being recharged during daylight hours by the solar cells 16, this would provide for automatic illumination of the collar at the required times.

In an alternate embodiment, a pulsing switch may be used to alternately illuminate two groups of illuminating means. The pulsing switch would be electronically connected to the power means 20 and the illuminating means 14. The pulse switch could consist of an astable multivibrator 25 whose output would alternately activate one of two switching transistors 26. The activation of one switching transistor would illuminate one set of illuminating means and charge a capacitor 27. The activation of the other switching transistor would allow the capacitor 27 to discharge through the other set of illuminating means thereby illuminating them. The astable multivibrator 25 could employ a quad two-input NOR gate. The pulsing switch would allow the frequency and duration of the illuminating means to be adjusted by adjusting the values of the resitance and capacitance in the astable multivibrator 25. Pulsing light is more noticeable than constant light, and pulsing light draws less energy. In this way, the visibility of the collar and the use of battery power can be balanced and optimized.

In the preferred embodiment and in other embodiments, pulse transformers 28 may be used to adjust the voltage supplied to the illuminating means 14. The pulse transformers 28 are electronically connected to the power means 20 and the illuminating means 14. The turns ratio of the pulse transformer can be selected to provide the proper voltage to the illuminating means.

The invention is described in detail with reference to particular embodiments, but it should be understood that various other modifications can be effected and still be within the spirit and scope of the invention.

What is claimed is:

1. An illuminated animal collar comprising: a plurality of illuminating means positioned on an outer surface of said collar; rechargeable power means electrically connected to said illuminating means; and, solar cells located on said collar and electrically connected to said rechargeable power means.

2. An illuminated animal collar according to claim 1, further comprising a power switch positioned on said collar and electrically connected in series with said illuminating means and said power means.

3. An illuminated animal collar according to claim 1, further comprising a light-sensing means to activate the rechargeable power means to illuminate the illuminating means when the ambient light falls below a certain level.

4. An illuminated animal collar according to claim 2, wherein the solar cells connected to said rechargeable power means are used as part of the light-sensing means to engage the rechargeable power means to illuminate the illuminating means.

5. An illuminated animal collar according to claim 1, further comprising a pulse means to alternately illuminate individual illuminating means or sets of illuminating means.

6. An illuminated animal collar according to claim 5, wherein the pulse means used to alternately illuminate the illuminating means is comprised of an astable multivibrator which alternately activates a first and then a second switching transistor whereby the activation of the first switching transistor illuminates a first set of the illuminating means and charges a capacitor; and whereby activation of the second switching transistor discharges the capacitor through a second set of the illuminating means thereby illuminating the second set of illuminating means.

* * * * *